PORTABLE TAPE PUNCH

PORTABLE TAPE PUNCH

Filed Jan. 2, 1964 3 Sheets-Sheet 2

INVENTORS
Elliott G. Lupton
Edward M. Murphy
BY
Mason, Fenwick & Lawrence
ATTORNEYS

PORTABLE TAPE PUNCH

Filed Jan. 2, 1964

INVENTORS
Elliott G. Lupton
Edward M. Murphy
BY
Mason, Fenwick & Lawrence
ATTORNEYS United States Patent Office 3,203,625

Patented Aug. 31, 1965

3,203,625
PORTABLE TAPE PUNCH

Elliott G. Lupton, 3001 Dakota NE., and Edward M. Murphy, 1004 San Pedro SE., both of Albuquerque, N. Mex.

Filed Jan. 2, 1964, Ser. No. 335,068
8 Claims. (Cl. 234—39)

This invention relates to tape punching devices, and particularly to a tape punch which is portable and manually operable.

There are many machines that are controlled by means of a punched, or perforated tape. The position, number and arrangement of holes in the tape govern the sequence in which the parts of the machine function, or the result which is obtained. The tapes are pre-punched in accordance with known data to produce a desired operation pattern. Usually, these tapes are prepared on costly, electrically operated punching devices according to submitted intelligence, or data. Frequently, it is desirable to change the tape pattern often, as conditions change, or a particular need arises. This necessitates shut down of the machine until a new tape can be acquired.

The general object of the present invention is to provide a portable punch, which is relatively simple and inexpensive and is manually operable, so that tapes may be punched in accordance with needs at the machine which is to use them.

A more specific object is to provide a device of this nature which is of light weight and can be carried and operated by a single operator.

Another object is to provide a portable tape punch with a novel and extremely simple key-controlled operating mechanism, which permits each key to punch a different opening, or selected group of openings, while actuating the tape feed and punching the tape feed pin hole simultaneously with punching the character openings or independently of the character punch.

A further object of the invention is to provide a tape punch of the type described having an operating mechanism which is readily adaptable to use in devices for punching five, six, seven or eight channel tape.

Other objects of the invention will become apparent from the following description of one practical embodiment thereof, when taken in conjunction with the drawings which accompany, and form part of, this specification.

Figure 1:
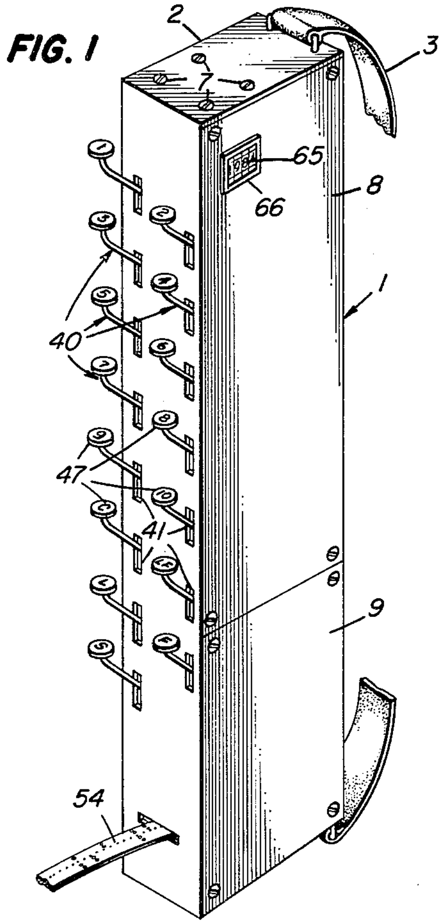
FIGURE 1 is a perspective view of a portable, manually operable tape punch constructed in accordance with the present invention.

In general, the punch of the present invention includes a frame in which a plurality of punch rods are slidably mounted, with each rod having one or more coding tabs located adjacent one or more operating keys, so that upon operation of each key, one or more rods will be forced down to punch a tape in a predetermined pattern. Each key when depressed serves to advance the tape and to punch a feed hole in it. The frame will be suitably housed to provide a finished appearance, and a means for carrying the unit will be attached to the casing.

Referring to the drawings in detail, the tape punch 1 is enclosed in a suitable housing 2, provided with a carrying strap 3 of any desired type. The operating mechanism is mounted upon a frame 4 which is fixed to the housing. The frame consists of a length of channel iron having spaced side members 5 and a back bridge member 6. The frame may be removably connected to the housing by screws 7. One side 8 of the housing may be removable for disassembly and repair, and an access door 9 is shown to permit replacement of the tape roll, as will be described.

The operating mechanism includes a plurality of punch blades, equal in number to the number of channels desired on the tape. In the present instance, a five channel tape is used and five blades 10, 11, 12, 13 and 14 are shown. Each blade is mounted for vertical sliding movement in guide blocks 15 which span the channel frame. Individual springs 16 connect the tops of the blades with a support rod 17, which traverses the channel frame near its top. This suspends the blades in the frame and yieldably holds them in their upper, inactive positions. At its bottom, each blade carries a punch pin, the respective pins being indicated at 18, 19, 20, 21 and 22. The pins have their lower ends guided in a bar 23, which extends across the frame just above a tape path 24 defined by the bar 23 and a punch die 25 spaced below the bar 23 a distance just slightly greater than the thickness of the tape to be used. The punch die is secured to the bar 23 in proper spaced relation, and is in the form of a member of suitable die metal having a plurality of die openings 26, equal in number to the punch pins and in axial alignment with them. The normal position of the pin lower ends is flush with, or slightly raised above, the lower surface of the guide bar 23.

There is a sixth blade 27 arranged beside the group of five punch blades, and mounted for vertical sliding movement in the guide blocks 15. Blade 27 is essentially the same as the blades 10 to 14, but it carries no punch pin. Instead, blade 27 carries an offset finger 28 at its lower end, the bottom end 29 of which serves as an advancing pawl to rotate a ratchet 30. Blade 27 is normally held in elevated, or retracted, positon by a spring 31 secured to the support rod 17. Ratchet 30 is mounted on a shaft 32 supported at its ends in bearings attached to the frame sidewalls 5. Mounted on shaft 32, at a position to lie in a vertical plane intermediate the punch pins 12 and 13, is a rotary punch 33 which consists of a roller 34 having punch pins 36 extending radially in equi-spaced arrangement. The pins 36 are spaced to enter openings 39 in a combination feed roller and punch die 37 mounted upon a shaft 38 below the tape path, and advance the feed roller as ratchet 30 is advanced. As the intermeshing of the pins of roller 34 and the die openings of roller 37 is through tape moving along the feed path, the tape will receive a perforation each advance movement of the ratchet, rotary punch and feed wheel. This forms a series of sprocket feed holes in the tape.

The six blades of the unit are caused to move downwardly by selective manual operation of a plurality of operating keys 40 which project through slots 41 in the housing. Each key has a base yoke 42 which is U-shaped, having arms 43 pivoted at their free ends to the frame, as at 44, and a bridge member 45 which actually engages and operates the blades. An operating lever 46 having a depressing key 47 at its outer end is connected to one of the arms of the yoke and projects through the adjacent slot 41 in the housing. Adjacent keys have their operating levers joined to opposite arms of the base yokes so that the depressing keys are arranged in two parallel rows along the front of the housing.

Figure 2:
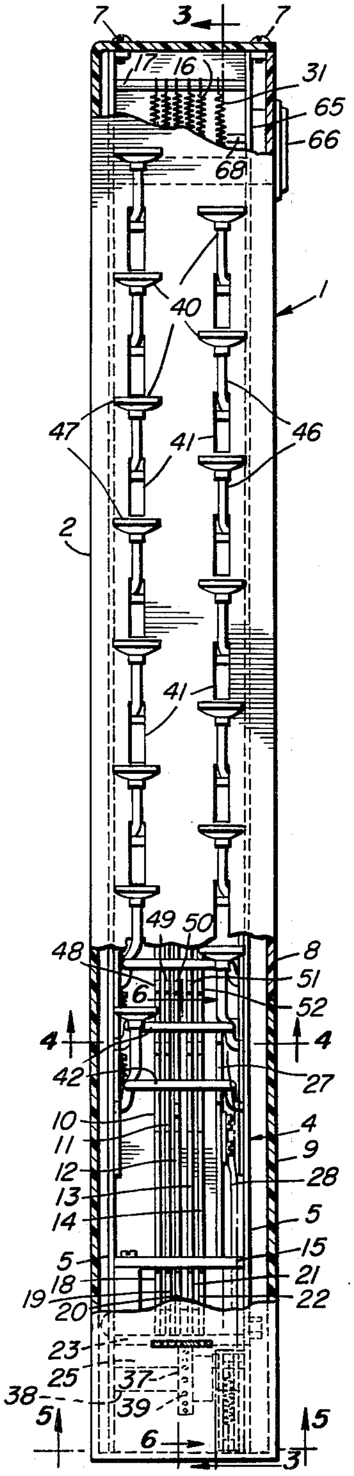
FIGURE 2 is a front view of the device with parts of the casing being broken away to show interior structure.
Figure 4:
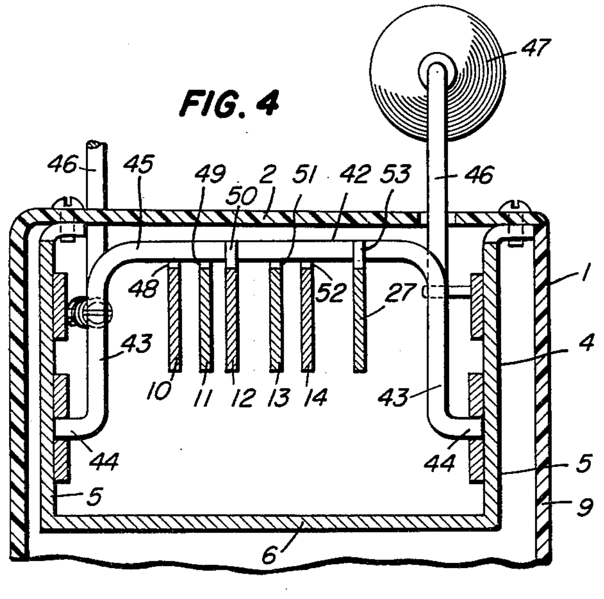
FIGURE 4 is a horizontal section on an enlarged scale, taken on the line 4—4 of FIGURE 2 and looking toward the top of the device.

Depressing a selected key will cause one or more of the blades to be moved downwardly to punch the tape in accordance with the code pattern of the particular key. To accomplish this, the blades will have coding tabs projecting forwardly beneath the key positions, to be contacted and moved downwardly by the bridge 45 of the selected key as the key is depressed. The coding tabs for the respective blades 10 to 14 are indicated by the reference characters 48, 49, 50, 51 and 52. A tab of a particular blade is positioned beneath a designated key only if movement of that key is to operate the blade. It is obvious that each blade will be included in several code combinations and, therefore, will be operated by more than one key. For example, the uppermost key in the left-hand row, as seen in FIGURES 1 and 2, may be coded to operate blades 10, 12, 13 and 14, and tabs 48, 50, 51 and 52 will be placed adjacent that key position. The top key of the right-hand row may operate blades 10, 13 and 14 and tabs 48, 51 and 52 will be positioned on these blades in the path of movement of the bridge member of this key. Thus, all of the keys will be coded and operation of each key will provide a different arrangement of punched openings in the tape.

Figures 3, 5:
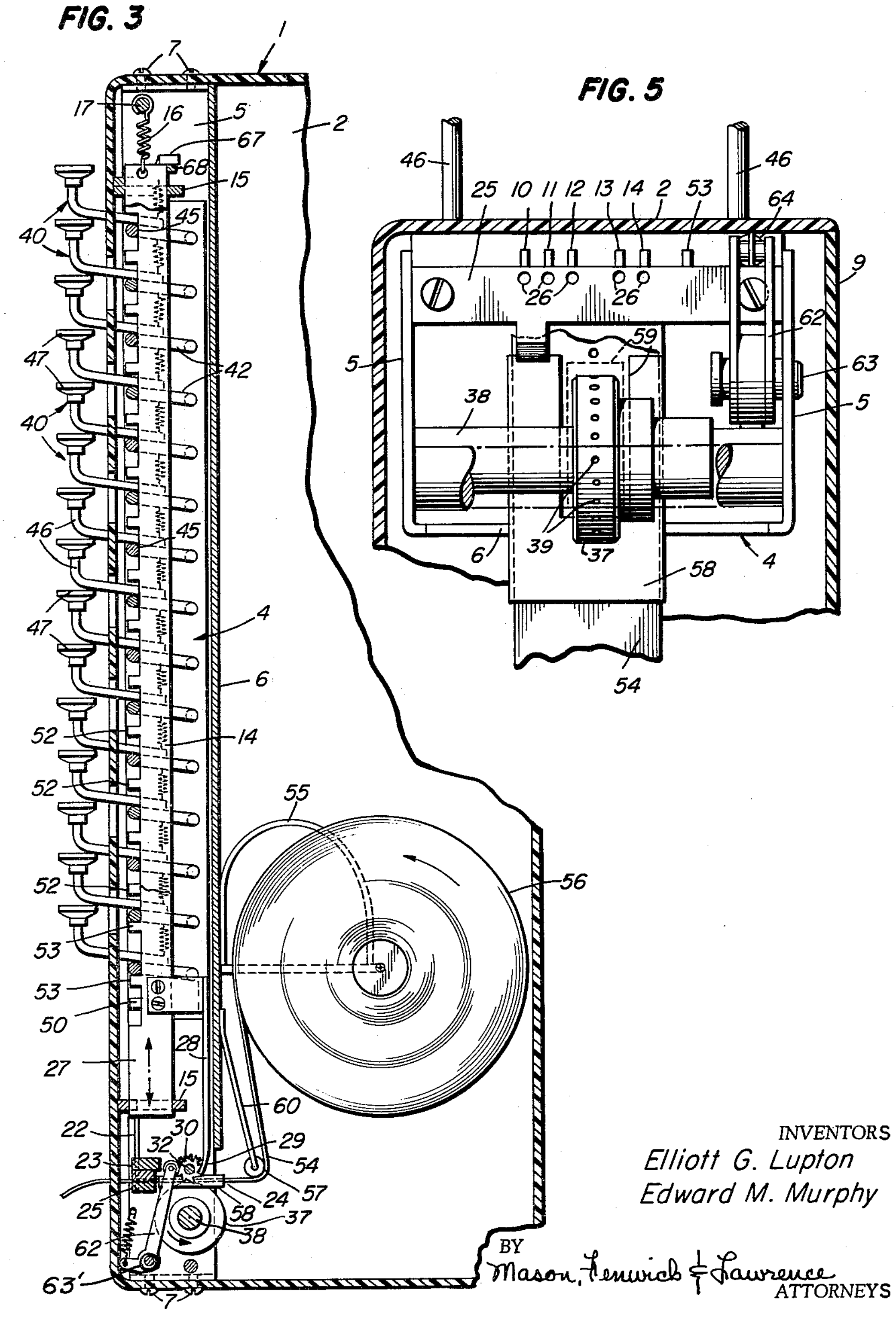
FIGURE 3 is a vertical section through the apparatus.
FIGURE 5 is also a horizontal section and is taken on the line 5—5 of FIGURE 2 also looking toward the top of the enclosure.
Figure 7:
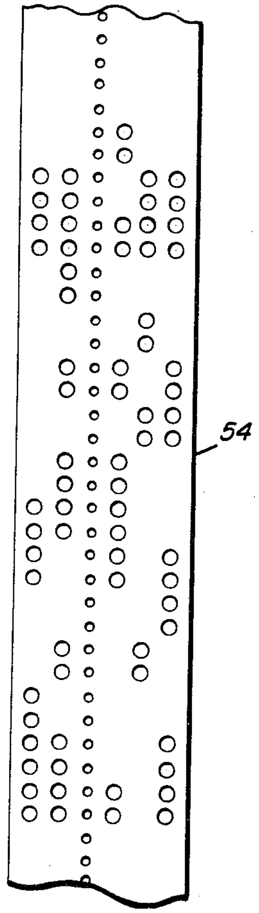
FIGURE 7 is a plan view of a length of punch tape.
Figure 6:
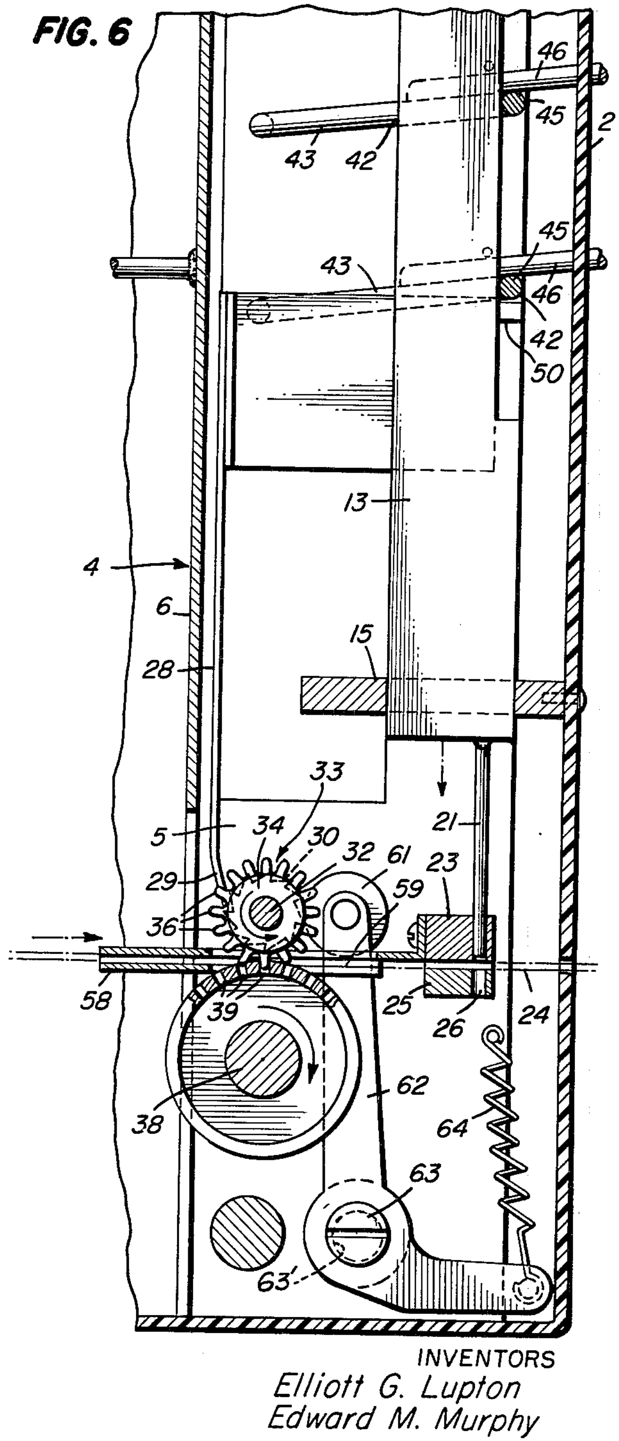
FIGURE 6 is a fragmentary vertical section on an enlarged scale, taken on the line 6—6 of FIGURE 2.

The tape advancing blade 27 has a tab 53 beneath the yoke of each key, so that operation of any key will serve to advance the tape as well as punch the selected code. It will be noted from FIGURE 3 that blade 27 in its retracted, inoperative position has its tabs 53 closely adjacent the yokes 42 of the keys whereby downward movement of blade 27 will begin almost immediately upon depressing movement of a key. On the other hand, the tabs of the punching blades are spaced considerably below the yokes. The relative positions of tabs 53 and the tabs of the punching blades are such that when a key is depressed it will first contact a tab 53 and move the blade 27 downwardly to complete its tape feeding action before the tab of a punching blade is contacted. Thus, the tape will complete one advance step before each punch, and any key may be used as a tape advancing key simply by depressing it far enough to move blade 27 through an advancing stage and then releasing the key before contact is made with a punching blade tab. This assures a tape feed each punching operation, and eliminates the need for a separate tape advance key to move the tape when no code punch is desired.

The tape 54 is shown mounted at the back of the frame upon a tape holder 55. Unpunched tape is supplied in a roll 56 which is freely rotatable on the holder 55. The free end of the tape is led over a roller 57 to a tape guide 58. The guide may be attached concurrently to the back of die 25, and is in the form of a flat tube extending along, and defining, the feed path 24. The tube is slotted top and bottom, as at 59 in the area of the rotary punch 33 and feed roller die 37 so that these members may have contact with the tape. Roller 57 is mounted on a spring arm 60 to permit the roller to move under sudden pull to avoid breaking the tape. In order to prevent overrunning of the tape feed mechanism, a friction roller 61 is provided to bear against ratchet 30 in the manner of a holding pawl. The roller 61 is carried at one end of a bell crank 62 which is pivotally mounted at its center on the frame, as at 63. At 63 is an eccentric adjusting screw 63' to adjust the position of the pin feed holes for alignment which holes punched by the punch pins. The opposite end end of the bell crank is attached to one end of a spring 64 which is connected to the frame to bias the roller 61 toward the ratchet.

In order to give visual indication of the steps of coding of a tape, a counter 65 may be mounted on the frame 4 so that its indicator will be visible through a window 66 in the housing. Feed blade 27 is provided with a finger 67 at its top (see FIGURES 2 and 3) to overlie the actuating arm 68 of the counter, so that each downward movement of the blade will cause operative movement of arm 68 to register a count.

It will be apparent from the above description that a tape punch constructed in accordance with the present invention will provide a light weight, portable punch which may be carried with ease wherever it may be needed. It can be used to produce coded, punched tape in accordance with requirements in a rapid and efficient manner. Obviously, punches may be made for tapes having more or fewer channels than the five shown, simply by using more or fewer punch blades.

While in the above one practical embodiment of the invention has been disclosed, it will be apparent that the details of construction shown and described are merely by way of example, and the invention may take other forms within the scope of the appended claims.

What is claimed is:

1. A portable tape punch comprising, a frame, a plurality of punch blades mounted in side by side relation within the frame for reciprocable sliding movement therein, means to bias each punch blade toward an inoperative position, a die held in the frame spaced from the punch blades in the direction of operative movement of the punch blades, a punch pin associated with each punch blade and movable toward and into the die when the punch blades are moved in the direction of operative movement with all of the punch pins lying in a single plane, means defining a tape path across the die on the side adjacent the punch pins and transverse to the plane of the punch pins, a supply of tape for movement along the tape path, means to advance the tape in equal steps and punch a sprocket feed hole in the tape each step of tape advance including a feed blade mounted in the frame for reciprocable sliding movement and having an operative movement in the same direction as the operative movement of the punch blades, and a plurality of keys pivotally mounted on the frame for operative movement in the direction of operative movement of the punch blades and feed blade, and means on the punch blades and feed blades for contact by the keys during movement of the keys in an operative direction, whereby movement of a selected key in an operative direction will cause predetermined punch blade movement and feed blade movement to punch a sprocket hole and feed the tape and produce a desired punch pattern in the tape.

2. A portable tape punch as claimed in claim 1 wherein, there is an additional key for contact only with the feed blade.

3. A portable tape punch as claimed in claim 1 wherein, the frame is enclosed within a housing with the keys projecting through the housing and accessible outside the housing, means on the housing to provide a carrying member, and means to provide access to the interior of the housing to renew the tape supply.

4. A portable tape punch as claimed in claim 3 wherein, there is a counter connected to the means to advance the tape and operable each operation of the tape advancing means to register the steps of tape advance.

5. A portable tape punch as claimed in claim 1 wherein, the means to advance the tape includes a pair of feed rollers one on each side of the feed path, and means connected to the feed blade to rotate the rollers in predetermined steps.

6. A portable tape punch as claimed in claim 5 wherein, one of the feed rollers has radial openings therein to form a die roller with the openings spaced around the periphery of the roller distances equal to the length of tape feed per step of tape advance, the roller of said pair of feed rollers having a plurality of punch pins projecting radially therefrom spaced for entry into the openings in said die roller, whereby tape will be punched each step of advance to provide a sprocket hole feed track on the tape.

7. A portable tape punch as claimed in claim 6 wherein, there is a ratchet connected to one of the rollers of the pair of rollers, and the means connected to the feed blade includes a pawl for engagement with the ratchet to rotate the ratchet one feed step each movement of the feed blade.

8. A portable tape punch comprising, a frame, a plurality of punch blades mounted within the frame for sliding movement therein, means to bias each punch blade toward an inoperative position, a die held in the frame spaced from the punch blades in the direction of operative movement of the punch blades, a punch pin associated with each punch blade and movable toward and into the die when the punch blades are moved in the direction of operative movement, means defining a tape path across the die on the side adjacent the punch pins, a supply of tape for movement along the tape path, means to advance the tape in predetermined steps, and means operable to move the punch blades in selective groupings in the direction of operative movement, the means operable to move the punch blades including a plurality of pivoted keys, with each punch blade having a projecting tab in the path of depressing movement of each key with which the punch blade is to cooperate, whereby depressing a selected key will cause predetermined punch blade movement to produce a desired punch pattern in the tape, the means to advance the tape including a feed blade slidably mounted in the frame and biased toward an inoperative position, tape feed rollers and means interconnecting the feed blade and the feed rollers to rotate the feed rollers one step of tape feeding movement each movement of the feed blade from its inoperative position, a tab on the feed blade in the path of depressing movement of one of said keys, whereby depressing movement of said one of said keys will advance the tape one step, additional tabs on the feed blade to position a feed blade tab in the path of depressing movement of each of said keys, whereby depressing movement of any of said keys will advance the tape one step, and the feed blade tabs when the feed blade is in its inoperative position being closely adjacent the keys whereby the keys will contact the feed blade tabs at the commencement of depressing movement, and the punch blade tabs when the punch blades are in their inoperative position being spaced from the keys a distance not less than the downward travel of the feed blade necessary to complete one step of tape advance, whereby a step of tape advance will be completed upon depressing each key prior to contact of the key with a punch blade tab.

References Cited by the Examiner

UNITED STATES PATENTS

| | | | |
|---|---|---|---|
| 711,660 | 10/02 | Hackett | 234—106 X |
| 2,945,538 | 8/60 | Little et al. | 234—51 |
| 2,969,173 | 1/61 | Schmitz | 234—128 X |

WILLIAM W. DYER, Jr., *Primary Examiner.*

WILLIAM S. LAWSON, *Examiner.*